Inventor
Harold Walden
By Wilfred Lawson

United States Patent Office 2,729,434
Patented Jan. 3, 1956

2,729,434

SELF-CLEANING BEATER

Harold G. Walden, Greenville, Maine

Application August 20, 1953, Serial No. 375,398

4 Claims. (Cl. 259—1)

This invention relates to improvements in kitchen or culinary apparatus and is directed particularly to a self-cleaning beater for rotary mixers.

A principal object of the present invention is to provide an improved beater for replacing the conventional beaters of kitchen mixers, egg beaters and the like, having a plurality of beater fingers, with means whereby such beater fingers may be easily and quickly cleaned or wiped free of batter or other material in which the fingers have been working.

Kitchen mixers or beaters commonly employ a rotating head having a number of elements which are rapidly rotated in the batter or other material to be mixed. Such rotation of the elements naturally causes the same to be completely covered with the material and the material is also thrown or spattered over the top of the mixer so that it is a relatively difficult job to clean the mixer head after the work is completed.

In accordance with the present invention there is provided a beater head having mixing fingers and a relatively simple device which is applied to the fingers and positioned against the under side of the top plate or head to which the fingers are attached, before beginning the mixing operation, so that after the operation is finished the device is removed and in the act of removing it the fingers are thoroughly wiped or cleaned of the material in which they have been operating.

A further and more specific object of the invention is to provide a beater head in the form of a disk or a plate having a number of flat radiating arms carrying a number of mixing fingers and a corresponding disk or plate, in which are apertures to receive the fingers of the beater head and such disk, or such arms, is covered with a resilient material which has apertures coinciding with the apertures of the disk, or the arms, to tightly encircle the mixing fingers which are forced therethrough. The apertures of the resilient material accordingly, when the applied disk is removed from the mixing fingers, wipe along the mixing fingers and thus remove any of the batter, cake mixture or other material in which the mixing fingers have been operating.

The invention will be best understood from a consideration of the following detail description taken in connection with the accompanying drawing forming a part of the specification, with the understanding, however, that the invention is not to be limited to the exact details of construction shown and described since obvious modifications will occur to a person skilled in the art.

Figure 1:
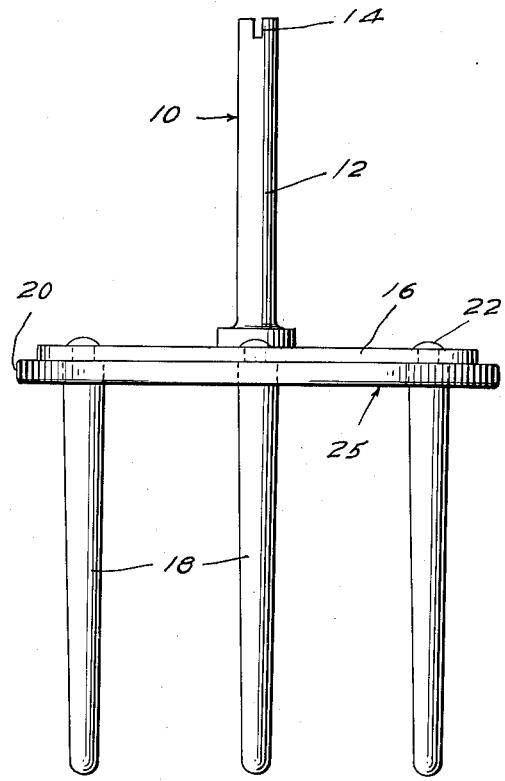
Figure 1 is a view in side elevation of the mixing head for a kitchen mixer and finger cleaner therefor, of the present invention.

Referring now more particularly to the drawing the numeral 10 generally designates the beater unit which is designed to replace conventional beaters used by manufacturers of kitchen mixers, egg beaters and the like.

This beater 10 comprises a drive shaft 12 which is adaptable for insertion into the power head of various types of electrically driven mixers or can be adapted to a hand operated egg beater or the like. The shaft 12 is provided with the notch 14 at its top end for locking it in the power head in the conventional manner.

The numeral 16 designates a disk which forms a part of the head and which has the shaft 12 secured in its center, as illustrated.

Figure 3:
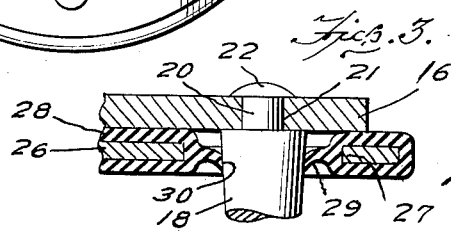
Figure 3 is a detail section taken substantially on the line 3—3 of Figure 2.

Disposed upon the side of the disk opposite from the shaft 12 is a plurality of beater fingers which are designated 18 and these fingers are of tapered form as shown and are secured at their upper or larger ends to the disk adjacent to the periphery thereof as illustrated in detail in Figure 3. In this figure it is seen that the finger 18 is provided with the reduced extension 20 which is extended through an aperture 21 in the disk head 16 and is mashed down at its top end as indicated at 22 to prevent its withdrawal from the aperture.

The material of the head and fingers may be of any character desired such as metal, plastic, spun glass or the like.

Figure 2:
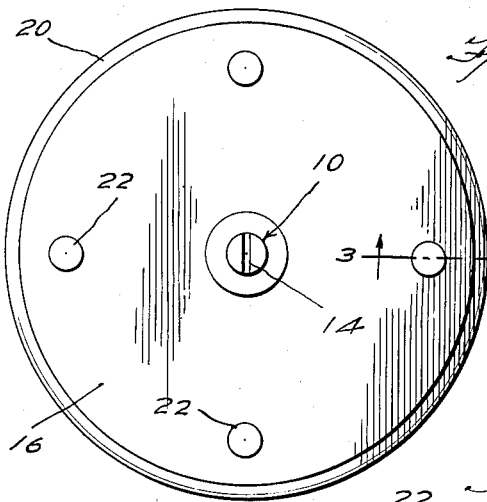
Figure 2 is a top plan view of the structure shown in Figure 1.
Figure 5:
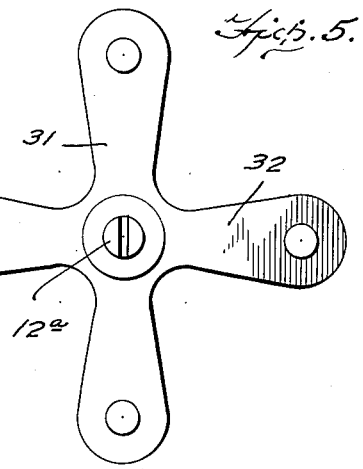
Figure 5 is a view in top plan of the structure shown in Figure 4.

The numeral 25 generally designates a cleaning element which is removably attached to the beater. This cleaning element comprises, in the embodiment illustrated in Figures 1 to 3, a plate 26 of any suitable material, which is of a diameter equal to or slightly greater than the diameter of the disk head 16 and this plate has formed therethrough adjacent to its periphery, a number of apertures 27 equal to the number of fingers 18 and such apertures are of a diameter materially greater than the maximum diameter of the fingers.

The plate 26 is covered over its top and bottom surfaces and across its edges with a covering, layer or skin 28 of rubber, Vinylite or the like and such covering also extends into each of the openings 27 to form a diaphragm 29 which has a central aperture 30 therein.

The aperture 30 of each of the diaphragms 29 is of a diameter slightly less than the minimum diameter of the finger which is extended therethrough so that the edge of the diaphragm opening will engage the surface of a finger extended therethrough, from the tip or free end of the finger up to the top end which is of maximum diameter.

In the employment of the present invention, before using the beater the cleaning disk 25 is applied by extending the fingers through the diaphragm openings 30 and forcing the cleaning disk upwardly against the under face of the head 16 of the beater. It will thus be seen that when the cleaning member is so placed each of the beating fingers 18 will be tightly encircled by the flexible diaphragm 29 and the engagement of the diaphragm with the fingers will hold the cleaning device firmly in position.

While the beater is in use the disk 25 will act as a baffle to stop flying batter, cream etc. When the beating action is completed the beater is tilted upwardly in the usual manner and the cleaning disk is then withdrawn from the fingers and in this withdrawing action the edges of the openings of the diaphragms, which have been stretched, will wipe along the length of the fingers and thus clean or strip off any of the material adhering thereto.

As shown in Figure 3 the diaphragms 29 lie in a plane between the top and bottom surfaces of the cleaning disk so that when the cleaning disk is removed from the fingers the batter, whipped cream or other material can be easily wiped off of the cleaning disk by the use of a spatula, knife or the like and returned to the mixing bowl.

Figure 4:
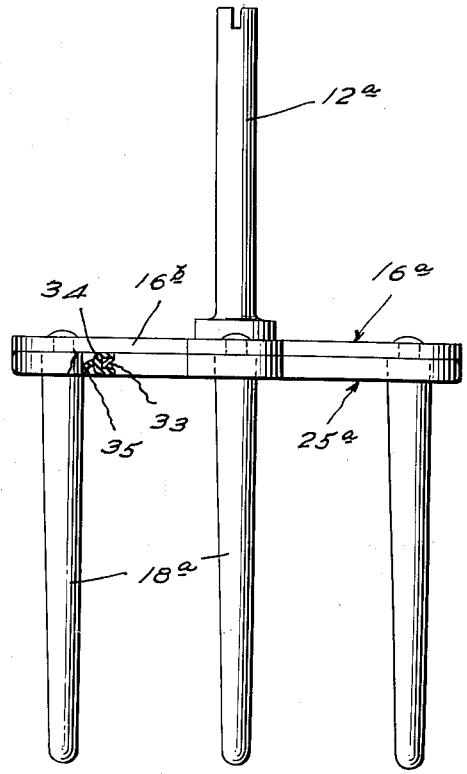
Figure 4 is a view in side elevation of a mixing head forming another embodiment of the invention in which the head and cleaner each comprises a series of flat arms instead of a disk.

In the embodiment of the invention illustrated in Figure 4 the beater illustrated is of a character to be used in multiple or in series where the beater head which is designated 16a comprises a series of radial, flat arms 16b secured to the shaft 12a. In this type beater when two or more heads are used on the mixer the ends of the arms intermesh.

In the second embodiment of the invention as designed to be used in association with a beater head where the finger carrying part comprises the radial arms 16b, the cleaner which is generally designated 25a comprises the central body portion 31 from which extend the radiating flat arms 32 which are of the same contour and number as the arms 16b of the beater head. The cleaner in this modified structure or second embodiment in effect is a flat plate like the cleaner 25 and this plate, designated 33, has openings 34, corresponding to the openings 27 and is likewise covered with resilient material such as rubber or the like corresponding to the covering 28, which extends into the openings 34 to form the aperture diaphragms 35 through which are extended the beater fingers 18a.

Since the second embodiment of the invention is of exactly the same character as the first embodiment designated 25, except for the fact that instead of being a disk it comprises a plurality of flat arms extending from a central body, it is not believed that more detail description of the second embodiment is required. In other words the same apertured diaphragms are employed in the second embodiment for wiping the fingers 18a when the cleaning device is removed from the beater head.

It will be seen that in the second embodiment, since the arms 32 are of the same length and width or general contour as the arms 16b of the beater, the cleaner will not interfere with the employment of a number of these radiating arm beaters in a group or series where the beater fingers inter-mesh.

From the foregoing description it will be seen that there is provided by the present invention a very desirable addition to mixers of the type described, which addition will be of material assistance to the user of the mixer in cleaning the mixing head after its use.

I claim:

1. A cleaning device for the beater of a rotary mixer employing a member of downwardly tapered parallel mixer fingers, said device comprising a flat body member having a plurality of apertures and said fingers depending therethrough, and a flexible diaphragm in each aperture having an opening through which a finger may be forced to be snugly engaged by the edge of the diaphragm opening, said member being slidable downwardly on said fingers to clean the same of any adhering material previously agitated by motion of the beater.

2. The combination with a mixing beater having a flat circular body and a plurality of spaced elongate tapered fingers depending therefrom, of a cleaner comprising a flat circular member adapted to be positioned against the lower side of said body, said member having an opening to receive each finger, and a diaphragm formed of a flexible material in each opening having a central opening through which a finger depends, each diaphragm opening being of a diameter smaller than the minimum diameter of the finger depending therethrough.

3. The invention according to claim 2, wherein said member comprises a plate encased in the flexible material of the diaphragms, said material being extended into the openings to form the diaphragms.

4. In a beater for a rotary mixer, a flat body comprising a pair of flat superimposed members, said members having a plurality of spaced apertures disposed in registry, the apertures in the upper member being smaller than those in the lower member, the edges of the larger apertures being flexible, a downwardly tapered finger having its larger end engaged in each of the larger apertures, and a cylindrical extension projecting axially from the larger end of the finger and having secured engagement in each of the smaller apertures, the lower member being unsecured with respect to the upper member and, upon completion of a mixing operation, will be withdrawn from the fingers which will be subjected to a wiping action by the flexible edges of the larger apertures to clear the same of any adhering portions of the mixed material.

References Cited in the file of this patent

UNITED STATES PATENTS

| 434,699 | Clarke | Aug. 19, 1890 |
| 1,303,500 | Rosenberg | May 13, 1919 |
| 2,553,242 | Dombitsky | May 15, 1951 |
| 2,612,352 | Singer | Sept. 30, 1952 |